Aug. 4, 1970 R. A. LANDRUM, JR 3,523,277
VIBRATION SURVEYING

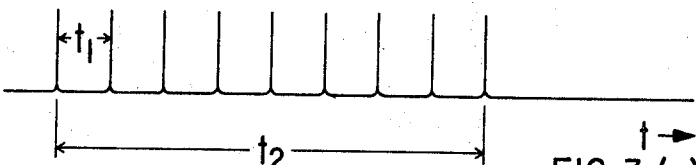
FIG. 3.(a) REPETITION PATTERN
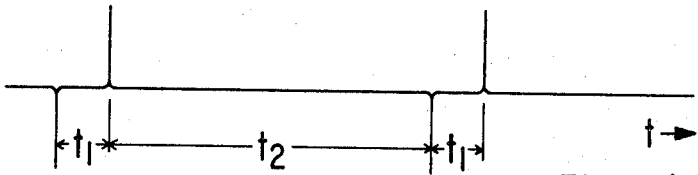
FIG. 3.(b) APPROXIMATE SPIKING FILTER
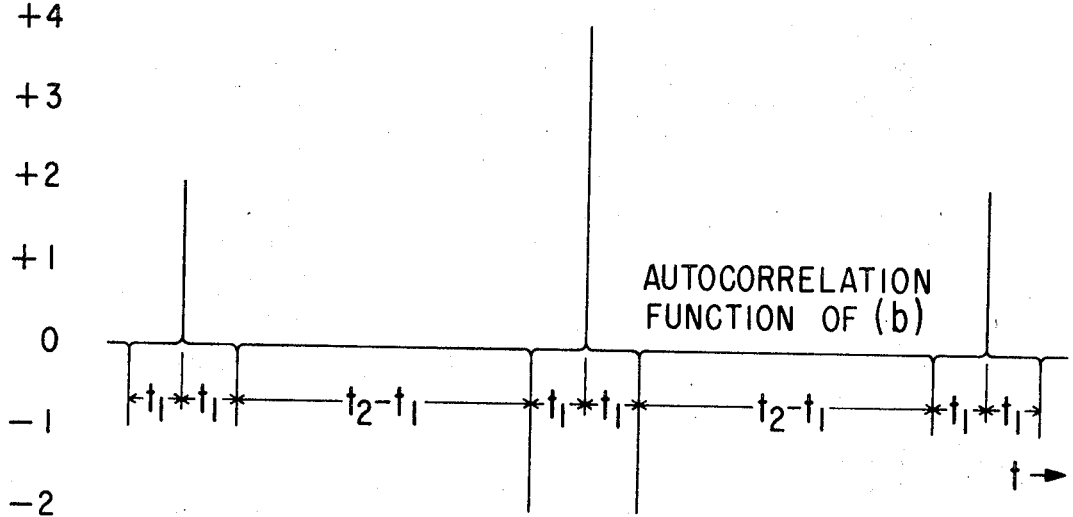
FIG. 3.(c) AUTOCORRELATION FUNCTION OF (b)
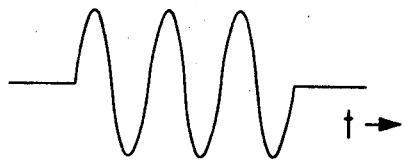
FIG. 4.(a)
FIG. 4.(c)
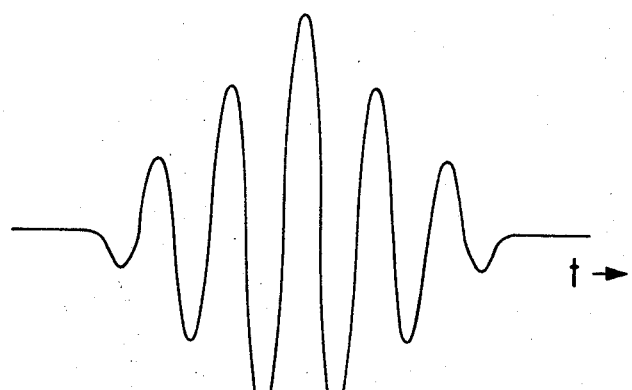
FIG. 4.(b)

Filed April 5, 1968 5 Sheets-Sheet 3

INVENTOR.
RALPH A. LANDRUM, Jr.
BY Paul Hawley
ATTORNEY

} REPETITION PATTERNS

} APPROXIMATE SPIKING FILTERS, INDIVIDUAL

United States Patent Office

3,523,277
Patented Aug. 4, 1970

3,523,277
VIBRATION SURVEYING
Ralph A. Landrum, Jr., Tulsa, Okla., assignor to Pan American Petroleum Corporation, Tulsa, Okla., a corporation of Delaware
Filed Apr. 5, 1968, Ser. No. 719,207
Int. Cl. G01v 1/28
U.S. Cl. 340—15.5                               6 Claims

ABSTRACT OF THE DISCLOSURE

This invention relates to geophysical seismic prospecting and allied techniques, where the source signal is a set of $n$ repetitions of a single basic wave, $n$ being essentially an integer. An example of such a signal is a truncated sine wave starting from zero amplitude and terminating a finite integral number of cycles later. These waves are sent from the source zone or area and are received, including echoes, at one or preferably a plurality of receiver locations. The received waves are made into a reproducible record, which is played back and correlated with a signal substantially equivalent to the source signal. This considerably increases the signal-to-noise ratio.

The correlated record is further played back and correlated with the autocorrelation function of the approximate spiking filter of the $n$ repetitions, to compress each part of the received signal corresponding to a single echo (or reflection) into a short duration, recognizable signal characterizing such reflection. After this, a visual presentation of these data is made.

Use of this system makes practical a vibratory source of waves operating at a single frequency for a finite time interval.

CROSS-REFERENCES TO RELATED APPLICATIONS

A prior invention, now copending application Ser. No. 609,527 of myself and John Shanks contains quite distinct but related subject matter.

BACKGROUND

This invention has particular pertinence in the field of seismic surveying, both by land and by water. It also can be used in other fields where echo-ranging is practiced, for example with some modification it may be used in burst or chirp radar. However, it is primarily concerned with seismic operations and is described hereinafter with specific reference to this field alone, since it will be obvious to those skilled in this art how it can be otherwise applied.

It has been known for a long time how to determine distance to a discontinuity in the earth, for example the boundary between the sea and the earth below, or the boundary between two earth strata of differing elastic properties, by propagating a seismic wave through the earth wherein the wave is essentially an individual pulse of seismic energy or at most a short-timed series of wavelets. Signals have accordingly been generated by detonation of explosives, or by the dropping of weights and the like. Later, it was recognized that vibratory signals of a unique and non-repetitive character could be utilized, and by a process of correlation such signals could be made the basis for records which closely resemble those from an explosive source. This is described, for example, in the Crawford and Doty Pat. No. 2,688,124. This system has distinct advantage in that it is unnecessary to drill shot holes to the depth of the weathered layer prior to the detonation of the explosive. It has the disadvantage that the vibrator employed must necessarily be one that can be driven in accordance with a specified signal which is of a nonrepetitive nature. It is well known that it is considerably easier to drive a vibrator, for example one containing two counter-rotating weights or the like, at one specific frequency than it is to drive it with a nonrepetitive signal.

Accordingly, it is an object of this invention to provide a system for vibration surveying and particularly seismic surveying in which the vibrating source produces generally a signal of one basic frequency.

It is recognized that the Fourier spectrum of a truncated sine wave involves a large number of components of differing frequencies. Simply for purposes of ease of communication, however, in the following specification the word "monofrequency" will be understood to mean a truncated wave essentially having identical period of the second and succeeding cycles to that of the first cycle. Accordingly, the system described below can be considered to use as a seismic source a series of $n$ repetitions of a single basic wave. Probably the simplest example would be a monofrequency sine wave in which all cycles have approximately equal amplitude. Such a signal is difficult to generate as such, and in practice it is only possible to approximate this by using a vibrator or earth shaker in which the signal amplitude of the first cycle is an appreciable fraction of that of, say, the third cycle, for example from $1/3$ to $2/3$ this amplitude. After a finite number of cycles $n$, the signal abruptly decreases to negligible amplitude.

I am aware that others have proposed systems employing a series of wave trains of an essentially sinusoidal wave form. For example, the McCollum patent, U.S. 3,182,743 makes use of a series of transmissions and receptions each of a monofrequency signal. In this case the waves received due to each wave train source must be recorded before the next wave train of a different frequency is transmitted. Ultimately, received waves are combined in such a fashion that only one of the half cycles from each train is in coincidence, to produce records resembling those from an explosion or the like. The Mifsud patent, U.S. 3,259,878 also teaches generation of continuous waves in bursts of seismic energy, each burst being at a different frequency, and determining from the transmitted and received seismic waves the relative amplitude and phase between these waves, then subsequently setting up equivalent signals with the appropriate amplitude and phase changes, which are added together to produce a composite reflected signal. This is rather akin to the method taught by the Smith et al. Pat. 3,291,297.

More recently, two patents of Burton McCollum U.S. 3,274,543 and U.S. 3,274,544 have been issued. In the first of these a single signal comprising a finite integral number of repetitions of a single basic wave, for example a monofrequency sine wave, is employed as in my current invention. After reception, the signal is processed by subjecting the reflections to signal frequency band suppression in which the initial and final pulses of the wave trains alone are theoretically recorded (provided that the wave train is of sufficient time duration). It is possible to detect either the initial, or the final half cycle, alone and by this means, make a record resembling that produced by an impulse type source such as an explosion. McCollum also teaches that it is possible to use a differential system involving both terminal pulses so that with a finite length wave train one can produce essentially results of a single impulse pulse. However, this system requires a pre-knowledge of the length of the wave train employed and also that the beginning and end of the wave train be of complete symmetry which is difficult to achieve in practice. It does offer an advantage over the multifrequency waves in that a single tuned vibrator can be employed, or its equivalent. There are some circumstances under which it will not work.

McCollum U.S. 3,274,544 also employs a monofrequency truncated wave train but requires a quite complicated system of reception of the signals to produce useful resultant energy. Here again the initial and final amplitude of the wave train to be employed must be essentially that of the balance of the train. The received signals are additively compounded to produce ultimately a diamond-shaped output wave for each reflection, or at best a derivative of this. This has a substantial disadvantage in that the ultimate wavelet ordinarily used by the geophysicist is the response to an impuse function, not a diamond-shaped pattern which is much less distinctive and permits much less interpretation in the case of closely overlapping waves (frequently encountered) than does the wavelet.

SUMMARY OF THE INVENTION

Basically, my invention is a system of seismic prospecting in which the generated seismic signal applied to the earth comprises a finite integral number of repetitions of the single basic wave (preferably at least a half cycle of a sine wave or a full cycle of such wave) which is propagated through the earth. Received waves at one or preferably a plurality of spaced locations forming a seismic spread are employed to make a reproducible record of received seismic waves, for example on a multichannel tape recorder. The received records are correlated with a signal which is either a replica of the seismic signal entering the ground or is substantially equivalent to this, for example the pilot signal driving the ground vibrator. This produces high discrimination against random noise. The correlated record is further correlated with the autocorrelation function of the approximate spiking filter of the repetition pattern employed in the signal applied to the ground. (The definition of the "approximate spiking filter" is given below.) This compresses in time the correlated seismic signal essentially to that which would be produced by an impulse. The output of this correlation step is employed to produce a visual record as an output. This visual presentation may be in any of the known systems for presenting such seismic material, for example in the form of a record section.

While this system ideally produces its best output when all of the seismic waves forming the monofrequency seismic signal are of equal amplitude, it is recognized that it is difficult in practice to produce this, and usually is not worth the effort. I have found that it is possible to employ such a monofrequency signal in which the first half cycle contains only half or third of the normal amplitude.

BRIEF DESCRIPTION OF THE DRAWINGS

In the drawings which form a part of this specification and are to be read in conjunction with the written material.

FIGS. 3($a$)–3($c$) show in graphical form a repetition pattern, its approximate spiking filter pattern, and the autocorrelation function thereof.

FIGS. 4($a$)–4($c$) show a very brief monofrequency wave, a correlated signal resulting from it, and a wavelet resulting from correlating this with the autocorrelation function of the approximate spiking filter.

DESCRIPTION OF THE PREFERRED EMBODIMENT

Figure 1:
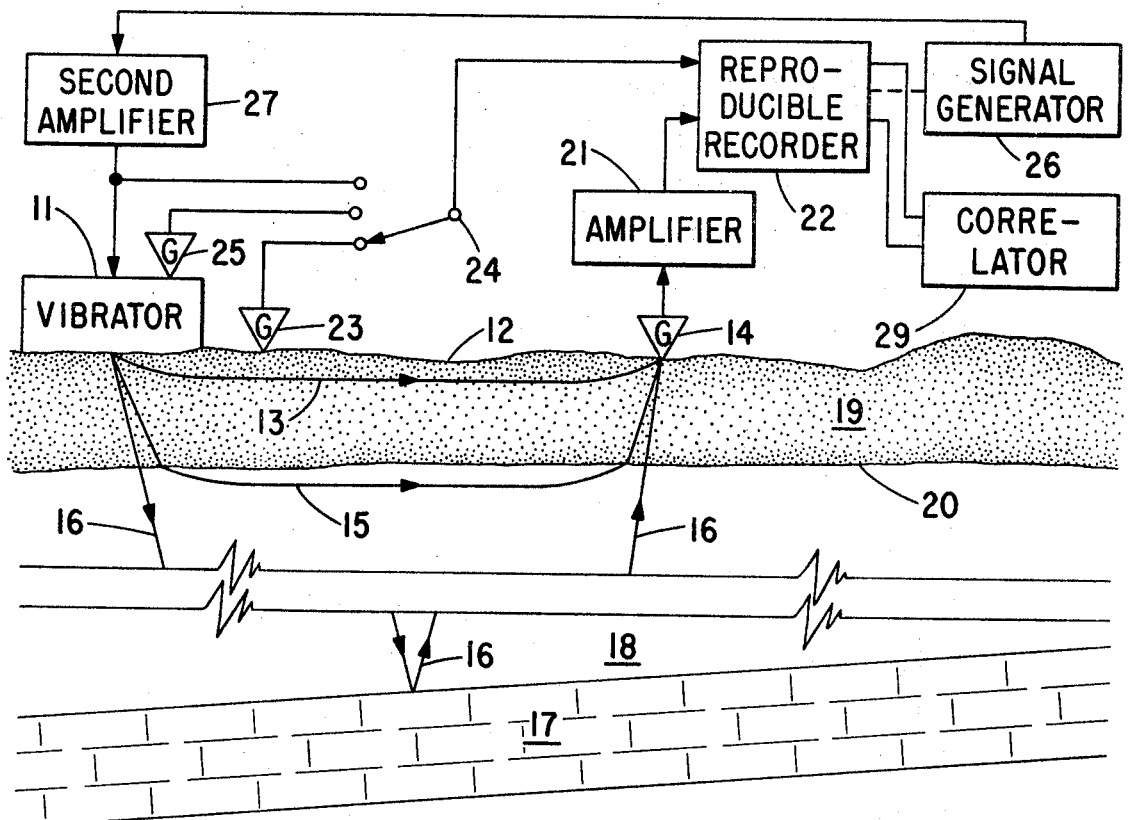
FIG. 1 shows in diagrammatic form a cross section of the earth, and equipment units which function together to generate in an area of the earth a seismic signal of the desired wave form and to receive in reproducible form, waves from the source.

Referring now to FIG. 1, a seismic vibrator 11 has been mounted firmly on the surface of the earth 12 to send out seismic waves of the desired monofrequency pattern, i.e., a finite integral number $n$ of repetitions of a single basic wave. Such waves propagate outwardly from the source in all directions. Certain simplified ray paths only are shown comprising first a surface wave path 13 between the vibrator 11 and a geophone or receiver 14 on the surface of the earth at a distance from the vibrator 11, a refracted ray path 15 between these instruments, and a reflected wave path 16. This latter is shown impinging on a bed 17 having different elastic constants from that of the earth 18 above this stratum, in which case part of the incident energy is reflected along the continuation of path 16 to the geophone 14. The part of the earth directly below the vibrator 11 is a "weathered layer" 19 which extends essentially to the top of the water table 20. It is due to the different mechanical properties of the weathered layer 19, the consolidated subsurface 18 and the subsequent lower strata such as 17 which result in the form of the wave paths 13, 15 and 16 shown.

Signals generated by geophone 14 customarily are of too low an amplitude for recording and consequently the electric signal output of this geophone goes to an amplifier 21 and hence to a reproducible recorder such as a tape recorder 22. I prefer to record synchronously with the response of geophone 14, a signal substantially equivalent to the generated seismic signal. This may, for example, be the response of the earth essentially at the vibrator 11, for example from a geophone 23 planted at this position, the signal from which passes through switch 24 to another channel of the tape recorder 22. As alternatives, one may use the response of a geophone 25 mounted on the vibrator itself, or the output of the pilot signal which electrically drives the vibrator 11. This latter is preferably achieved by driving synchronously with the tape recorder 22 a signal generator 26 on a channel of tape of which has been previously recorded the desired monofrequency signal which is to be reproduced by the vibrator 11. Thus, as the tape drums of the two units 22 and 26 rotate, a desired pilot signal is generated in unit 26 which is in turn amplified by a second amplifier 27 which is used to drive the vibrator 11. Geophysical vibrators which can produce an output essentially in synchronism with that of an electric pilot signal are now quite well known in this art, and no detailed description of such is believed warranted.

Figure 2:
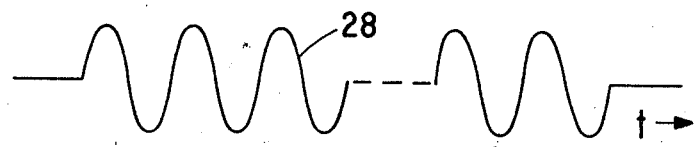
FIGS. 2($a$)–2($e$) show a repetition pattern obtained in the analysis of the truncated monofrequency wave signal.
Figure 2:
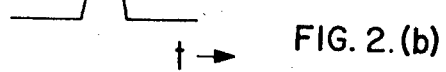
Figure 2:
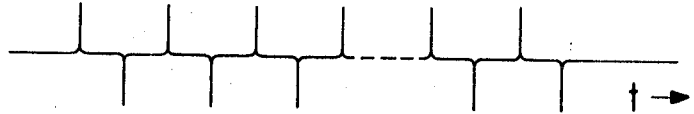
Figure 2:
Figure 2:
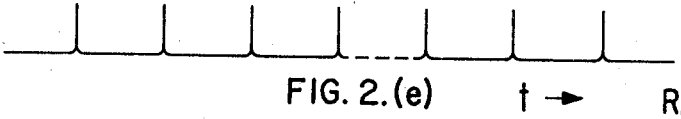

I prefer to have the seismic signal generated in the earth by vibrator 11 be as nearly as possible a monofrequency signal involving integral repetitions of a single basic wave. This, for example, is shown at FIG. 2($a$), in which the signal 28 applied to the earth consists ultimately of pressure and refraction half cycles of a sine wave, starting from zero amplitude and ultimately returning to this amplitude. It is to be noted that each cycle of this wave is essentially repetitious and hence the signal is in no sense unique.

The repetition pattern can be considered to be that of a basic half cycle shown at ($b$) of FIG. 2, the repetitions being alternately positive and negative unit outputs, as shown by the repetition pattern ($c$) of this figure. It is obvious, of course, that this wave or signal 28 can also be considered to be a series of integral repetitions of a whole cycle of a sine wave shown at ($d$), in which case the repetition pattern is a series of unit outputs all in the same direction, as shown by pattern ($e$) of FIG. 2.

This signal is received at geophone 14 in the presence of noise, i.e., undesired seismic signals, which (along with signal overlapping) tends to make identification of any feature on the received record impossible. In fact, a main objective of any geophysical surveying system is to enhance the signal-to-noise ratio as much as possible. The signal-to-noise ratio can be improved at the expense of changing the type of signal appearance by correlating the record with a signal substantially equivalent to the generated seismic signal. This is accomplished by correlating the signal recorded through switch 24 with the record of the output of amplifier 21, as shown diagrammatically by correlator 29 in FIG. 1. There are a number of systems for correlating two recorded signals, and since no claim is made in this invention for novelty in this step by itself, it is sufficient to state that any correlation system in effect multiplies the amplitude of the received signal from amplifier 21 by the corresponding amplitude of the signal from switch 24, sums up the resultant products, then shifts the timing between these two signals and again makes this summed product, producing an output of the summed product against the timing shift. Examples of equipment useful in making this correlation are shown in U.S. Pat. 2,779,428 and Pat. 3,273,113.

It is to be noted that the received signals are correlated with one which is substantially equivalent to the generated seismic signal. The correlating signal can, therefore, be from a geophone on the earth close to the shaker, such as geophone 23, or from one (25) positioned on the shaker, or can be the signal from the output of the second amplifier 27.

While such correlation very greatly enhances the signal-to-noise ratio, it definitely changes the form of a reflected signal received by a geophone. An example of this is shown in FIGS. 4(a) and (b). In (a) is shown a mono frequency signal involving three integral repetitions of a single basic sine wave, or six half cycles of such a wave (only a few cycles being shown for simplicity of representation). When such a signal is received in the absence of other signals, and is crosscorrelated against the signal substantially equal to that shown in (a), one obtains a correlation pattern or output substantially as shown in (b) of this figure. This can be regarded as a modulted sine wave, the modulation envelope being substantially a diamond-shaped pattern. Such signals are not particularly easy to identify and certainly from the fact that the time duration of this is essentially six cycles, it can be seen that recognition of such a signal in the reflection record from the layered earth would ordinarily be impossible, or at best extremely difficult. It is therefore desired to time-compress signals of the appearance of FIG. 4(b). I have found that this is possible so that a truncated signal of the form of 4(a) or even that involving many more repetitions of the basic wave can be time-compressed to produce an easily identifiable short characteristic pulse generally of the type shown in FIG. 4(c). In order to show how this is done, one should refer to FIG. 3, which considers the repetition pattern and a quantity which is called an "approximate spiking filter." This approximate spiking filter is a time-amplitude pattern which when correlated with a repetition pattern, produces an initial amplitude at the first point of correlation and a final amplitude at the last point of correlation with very low amplitude (preferably essentially zero) in between. For example, with a repetition pattern of the form shown in FIG. 3(a), the approximate spiking filter can be easily shown to be that shown in FIG. 3(b). It is to be recalled that the repetition pattern in FIG. 3(a) has essentially unit spikes separated by time intervals $t_1$ (the period of the basic wave) and occupying a total time $t_2$. An approximate spiking filter for this pattern consists of equal and opposite amplitude spikes occurring at time displacement $t_1$, followed by zero amplitude for a time $t_2$, after which the original pattern is again repeated. If the approximate spiking filter shown in FIG. 3(b) is correlated with the repetition pattern shown in FIG. 3(a), it will be found that there will be a single amplitude spike occurring when the end spike of the approximate spiking filter (b) coincides in phase with one end of the repetition pattern in FIG. 3(a), then no further response of such correlation for a time essentially equal to $2t_2+2t_1$. At this point there will be a single amplitude spike in the opposite polarity from the first one, thus satisfying the stated criterion above for an approximate spiking filter. It should be stated that other approximate spiking filters can be created which will extend the time between the responses upon correlation. Thus, at an end of the pattern shown in (b) there can be added after another time difference $t_2$ the identical pattern shown at either end of FIG. 3(b). Such an approximate spiking filter will upon correlation with this repetition pattern of FIG. 3(a) show no output for a period of essentially $3t_2+3t_1$. Further extension of this arrangement can be made for any desired delay between the time of the first correlation response and that of the last.

A preferred arrangement for handling the returning signal received by geophone 14 and correlated with a signal substantially equivalent to the generated seismic signal, comprises correlating this reproduced correlated record with the autocorrelation function of the approximate spiking filter. The autocorrelation of any function by mathematical analysis is well known in this art and need not be specifically described here. The autocorrelation of the approximate spiking filter shown in FIG. 3(b) is shown in FIG. 3(c). It is seen that this signal has a total time duration of $2t_2+4t_1$, and as in the case of any autocorrelation function, is symmetric about the midpoint. Correlation of the reproduced and correlated record which is the output of correlator 29 (FIG. 1) with the autocorrelation function of the approximate spiking filter of the $n$ repetitions, compresses in time each seismic reflection to a wavelet which has approximately twice the period of the single basic wave. Thus, for example, correlation of the pulses shown in FIG. 4(b) with the autocorrelation function of the type shown in FIG. 3(c) produces the wavelet pattern shown in FIG. 4(c).

It must be pointed out that after a lapse of time equivalent to approximately $3t_2$, a second compressed wavelet like that of FIG. 4(c) (but of opposite polarity) is produced. If the original seismic signal generated in the ground by the shaker 11 lasts for a period of time somewhat more than one-third of the total recording period during which waves received by geophone 14 are recorded by recorder 22, correlation of the correlated, received record with the autocorrelation function of FIG. 3(c) produces the reversed polarity pulses mentioned above only at a time exceeding the total recording time of the original record. If the ultimate record, which is the visual output of this last correlation, is recorded for the same time as the recording period, the reversed polarity wavelets are simply not recorded. If, on the other hand, the repetition pattern exists for a lesser time (which I may use, but do not prefer), it is only necessary to increase the duration of the approximate spiking filter as described above, and use the appropriate autocorrelation function of this increased approximate spiking filter. I prefer to operate in such a way that the time duration of the approximate spiking filter, plus the time duration of the repetition pattern, exceeds the travel time of seismic waves from the generation area to the deepest reflecting bed for which surveying is to be made, back to the seismic wave receiver. In this case, as discussed above, the reversed polarity compressed output signals occur too late to be recorded.

The approximate spiking filter is, of course, dependent upon the repetition pattern. If the repetition pattern chosen is that shown in FIG. 2(c), the approximate spiking filter is identical to that shown in FIG. 3(b) except that the two negative amplitude spikes shown are positive rather than negaitve. An extended or increased approximate spiking filter can be determined precisely as discussed above, for this repetition pattern. The autocorrelation function in this case has no negative peaks, but can be quickly determined in accordance with standard procedures for making autocorrelations.

Figure 5:
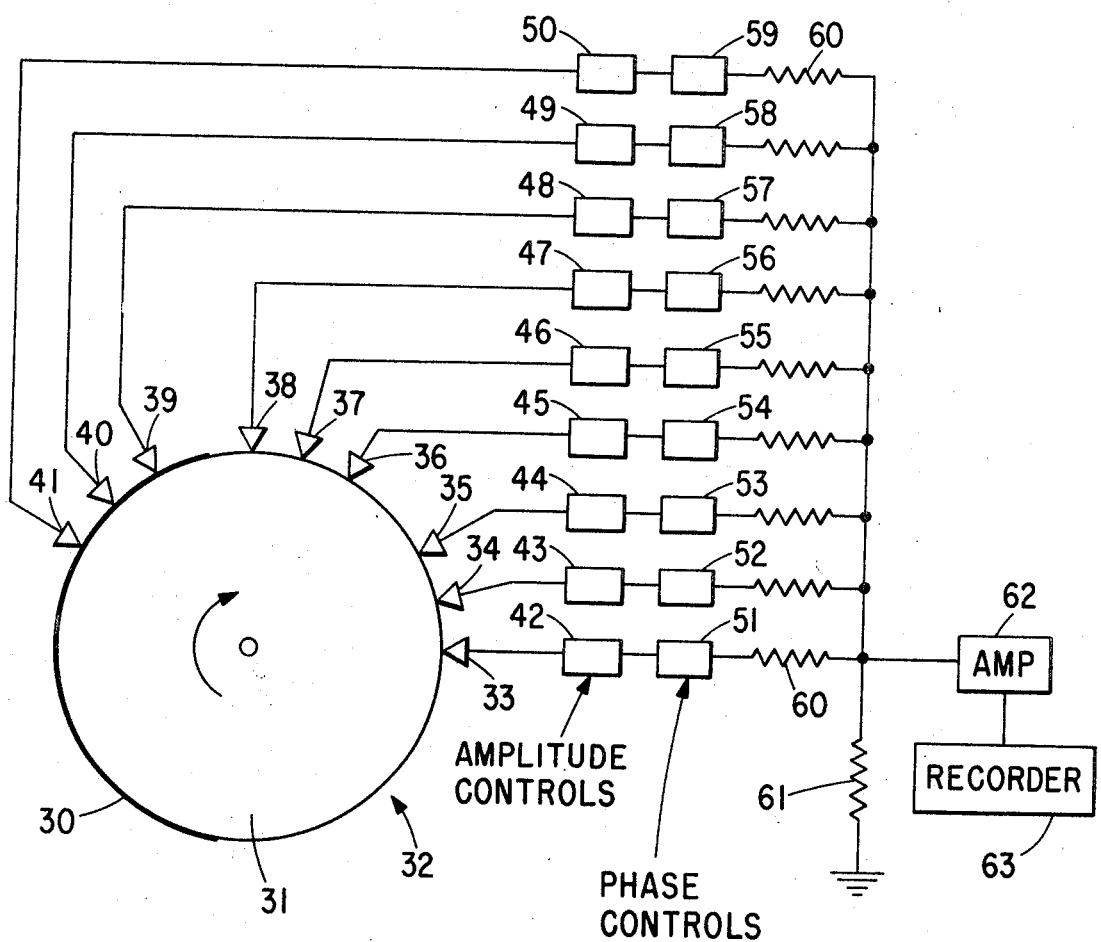
FIG. 5 illustrates apparatus useful for correlating a record with the autocorrelation function of the approximate spiking filter.

An apparatus for making the correlation between the reproduced and correlated record with the autocorrelation function of the approximate spiking filter is shown in FIG. 5. The problem is to reproduce the correlated record in time sequence and amplitude as set forth by the autocorrelation function of the approximate spiking filter. This, as was shown in FIG. 3(c) was in the case shown a 9-spike function. The correlation can be made advantageously by placing the reproduced correlated record in the form of a magnetic tape 30 on the periphery of a reproducing drum 31 of a reproducer 32. The drum 31 is arranged to be rotated at essentially constant speed. Nine pickup heads 33–41 are scattered around the periphery of the drum and close to it, such that the arcuate distribution of the three sets of three drums, considered with the rotary speed of drum 31 is such that the time interval between pickup at head 33 and that at head 34 is the time $t_1$ shown in FIG. 3.

Each of the pickup heads is connected to an amplitude control which preferably is a simple potentiometer 42–50 which in turn feeds a phase control (essentially a simple reversing switch) 51–59. The phase control in turn is connected through a high resistance 60 (uniform for all pickups), which are all connected together and feed a resistor 61 which is low compared to the value of the individual resistances 60. These resistances 60 are the conventional "add resistors" which produce an output across resistor 61 in direct accordance with the summations EMFS put out by all the phase controls. The output across resistor 61 is amplified by amplifier 62 and recorded by a recorder 63 to form the final visual record which is then developed and printed as in the customary fashion. Preferably a timing trace is also recorded by the recorder 63; such equipment is so well known it does not need description.

Control 42, for example, will be set for a relative amplitude of 1, control 43 will be set for a relative amplitude of 2, 44 will be set for an amplitude of 1, 46 for an amplitude of 2, 47 for an amplitude of 4, and so on. The phase controls for 51, 53, and 54 will be opposite to those for 52 and 55, for example.

Thus, the single rotation of strip 30 past the various pickup heads makes a correlation between the reproduced and correlated record on strip 30 with the autocorrelation function of the approximate spiking filter.

This method makes it possible to use a repetitive signal to produce reflected energy from the various subsurface beds in the form of a record which, upon the double correlation, resembles very closely the present seismic records made by exploding dynamite. The wavelet shown in FIG. 4(c) is essentially the so-called "Ricker wavelet" which geophysicists are accustomed to look for in such seismic surveying records. By the application of a long duration truncated wave (preferably existing for several seconds, for example from 3 to 6 seconds or more), it is possible to initiate a signal or relatively high energy compared to that which could be obtained from a shaker by applying a single pulse or a few pulses to the ground. If desired, the reproducible record obtained with one such repetitious signal can be directly added, point for point, to that due to another substantially identical seismic signal, to build up the amplitude and to decrease random noise; this technique again is well known, for example in the McCollum weight-dropping technique.

Figure 6:
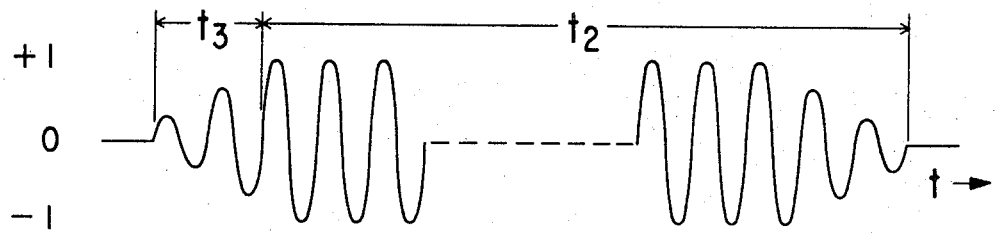
FIGS. 6($a$)–6($f$) show in graphical form a repetition pattern and its approximate spiking filter pattern for a previously recorded the desired monofrequency signal truncated wave which does not reach its normal amplitude in the first half cycle.
Figure 6:
Figure 6:
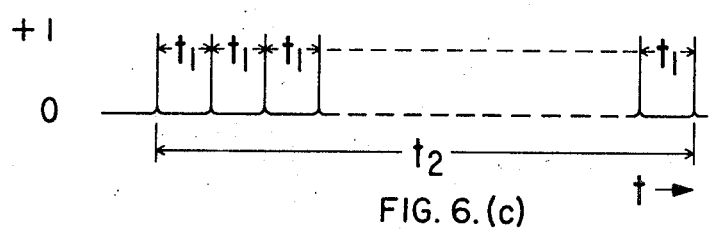
Figure 6:
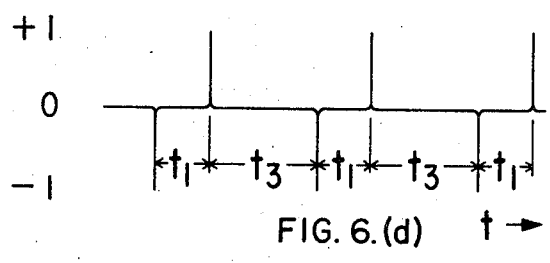
Figure 6:
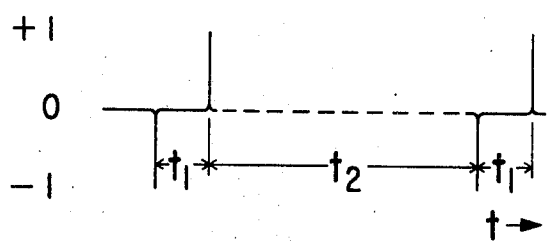
Figure 6:
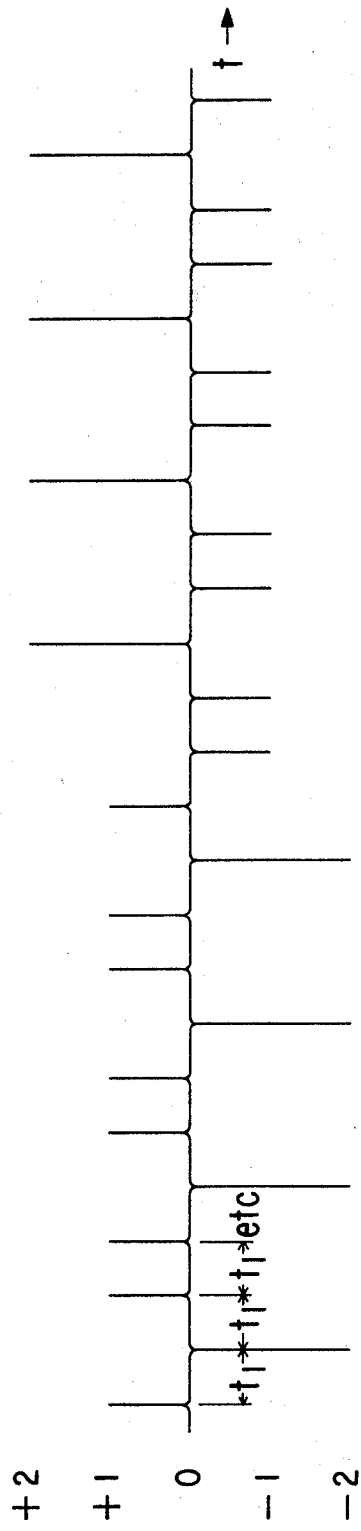

It was earlier mentioned that it was possible in this system to employ truncated waves of a desired monofrequency pattern in which the first half cycle was considerably less than the normal amplitude. For example the first half cycle might be ½ or ⅓ the amplitude of the normal amplitude. This situation is illustrated, for example in FIG. 6(a). A very useful approximation to such a signal consists in assuming that the first full cycle is ⅓ of the normal amplitude, the second full cycle is ⅔ of the normal amplitude, and the third full cycle is at normal amplitude. It can be shown that this can be obtained by convolving a repetition pattern, such as shown in FIG. 6(b) with the so-called standard repetition pattern (which exists for time $t_2$ and which is shown at FIG. 6(c)) with a single cycle of a sine wave whose period is $t_1$. Accordingly, the approximate spiking filter consists of the convolution of the approximate spiking filter which would satisfactorily give a single cycle during the standard recording period for pattern (b) convolved with a similar approximate spiking filter which would give a single cycle of a sine wave for the repetition pattern found in FIG. 6(c). The approximate spiking filter for this last has already been earlier discussed and is shown in FIG. 6(e).

The repetition pattern for the first three cycles in the case mentioned is shown in FIG. 6(b), consisting of three equal spikes of amplitude, ⅓ located one period apart ($t_1$) of the basic sine wave pattern shown in FIG. 6(a). The approximate spiking filter for such a repetition pattern is shown in FIG. 6(d), consisting of a positive amplitude of 1 followed by a negative amplitude of −1 at a period $t_1$, the pattern repeating after a time $t_3$ and the whole being kept up for a period of time sufficient to cause the residual impulse to occur off the end of the record. In case the truncated sine wave builds up in two cycles, that is a first cycle of ½ amplitude and the second cycle at full amplitude, there will be only two spikes of amplitude of ½ each in FIG. 6(d) and a corresponding change in the spike pattern shown for the spiking filter.

The approximate final spiking filter, then, is the convolution of the two spiking filters whose patterns are shown in FIGS. 6(d) and 6(e). This is shown in FIG. 6(f) and consists of a first amplitude of −1 followed at time $t_1$ by a second amplitude of +2, etc. It is to be noticed that this spike pattern has negative narrow symmetry about the middle. The corresponding autocorrelation function of the approximate spiking filter is not shown but it is immediately apparent to one skilled in the art how one goes about finding this, in precisely the same fashion as described in connection with FIG. 3(c). The rest of the procedure is as has already been described.

I have found that this system is particularly advantageous when it is desired to survey deeply into the ground. In prior methods, use of seismic energy utilizing vibratory sources has been hampered by the inability by such sources to transmit low frequencies—in the range of about 5 to 10 hertz—which are known to permit much deeper penetration than those of above 50 hertz. The use of the long-duration monofrequency transmissions of the type taught in this invention overcomes the inherent low-power output of vibratory sources at these low frequencies. The use of the double correlation technique permits maximizing the signal-to-noise ratio. The ability to use additive signals from more than one truncated vibratory source has already been mentioned.

Since the chief transmission band of seismic waves through the earth is from zero to about 50 hertz, my method finds particular application where the frequency of the truncated seismic signal comprising a finite integral number $n$ of repetitions of a single basic wave is at a basic wave frequency lying between approximately 5 and approximately 50 hertz.

It should be pointed out that each correlation, namely the correlation of the record with a signal substantially equivalent to the generated seismic signal, and the further correlation with the autocorrelation function of the approximate spiking filter, is a linear operation. Such correlations therefore can be carried out in whatever time sequence is desired. Thus, one may first correlate the received reproducible record with the autocorrelation function of the approximate spiking filter and subsequently correlate this reproducible record with a signal substantially equivalent to the original generated seismic signal.

Other variations of the method taught here will be apparent to those skilled in the art. The basic system is best described by the scope of the appended claims.

I claim:
1. The method of seismic surveying comprising generating in an area in the earth a seismic signal consisting essentially of a finite integral number $n$ of repetitions of repetitions of a single basic wave,
   receiving seismic waves due to said seismic signal at a receiver spaced a distance from said area and making a reproducible record of these received seismic waves,
   reproducing in an automatic data processing apparatus said record as an electric wave and correlating said record with a signal substantially equivalent to said seismic signal,
   further generating in said automatic data processing apparatus a varying electric signal directly responsive to correlating said reproduced and correlated record with the autocorrelation function of the approximate spiking filter of said $n$ repetitions to compress in time said seismic signal and
   producing a visual record equivalent to said electric signal.

2. The method of claim 1 in which said basic wave is at least one half cycle of a sine wave and in which said signal is at least approximately a monofrequency sine wave of a finite number of half cycles, said signal commencing at zero amplitude.

3. The method of claim 2 in which said basic wave is one cycle of a sine wave and in which said signal is at least approximately a monofrequency sine wave of a finite number of cycles, commencing with zero amplitude.

4. The method of claim 3 in which the frequency of said sine wave is between approximately 4 and approximately 50 hertz.

5. The method of claim 4 in which the time duration of said spiking filter plus the time duration of said seismic signal exceeds the travel time of seismic waves from the generation area to the deepest reflecting bed and back to said receiver.

6. The method of claim 2 in which the time pattern of said spiking filter consists of two positive values separated in time by half the period of said sine wave followed after the duration of said seismic signal by two negative values similarly separated in time by half the period of said sine wave, said basic time pattern being repeated throughout said time duration of said spiking filter.

References Cited
UNITED STATES PATENTS 3,259,878  7/1966  Mifsud _____ 340—15.5
3,274,543  9/1966  McCollum _____ 340—15.5

OTHER REFERENCES

Robinson: "Principles of Digital Filtering," Geophysics, vol. XXIX, No. 3 (June 1964), pp. 395–404.

RODNEY D. BENNETT, JR., Primary Examiner

C. E. WANDS, Assistant Examiner

PO-1050
(5/69)

UNITED STATES PATENT OFFICE
CERTIFICATE OF CORRECTION

Patent No. 3,523,277      Dated August 4, 1970

Inventor(s) Ralph A. Landrum, Jr.

It is certified that error appears in the above-identified patent and that said Letters Patent are hereby corrected as shown below:

Column 4, delete line 1 in its entirety.

Column 5, line 38, "modulted" should read --modulated--.

Column 7, line 56, "or" should read --of--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents